United States Patent [19]
Brandt et al.

[11] Patent Number: 5,483,818
[45] Date of Patent: Jan. 16, 1996

[54] METHOD AND APPARATUS FOR DETECTING IONIC CURRENT IN THE IGNITION SYSTEM OF AN INTERNAL COMBUSTION ENGINE

[75] Inventors: Arnold W. Brandt, Livonia; Thomas E. Jones, III, Rochester Hills; Robert B. Bucciarelli, Dearborn, all of Mich.

[73] Assignee: Ford Motor Company, Dearborn, Mich.

[21] Appl. No.: 320,344

[22] Filed: Oct. 11, 1994

Related U.S. Application Data

[63] Continuation-in-part of Ser. No. 43,121, Apr. 5, 1993, Pat. No. 5,321,978.

[51] Int. Cl.$^6$ .............................. G01L 23/22; G01N 25/20
[52] U.S. Cl. .................... 73/35.01; 324/393; 324/123 C; 324/609; 324/688; 324/399; 73/35.08
[58] Field of Search ............................. 324/688, 123 C, 324/393, 399, 609; 73/35.08

[56] References Cited

U.S. PATENT DOCUMENTS

| | | | |
|---|---|---|---|
| 4,270,090 | 5/1981 | Williams | 324/457 |
| 4,515,132 | 5/1985 | Anderson et al. | |
| 4,648,367 | 3/1987 | Gillbrand et al. | |
| 4,670,663 | 6/1987 | Fancher | 324/123 C |
| 4,719,409 | 1/1988 | Dorman | 324/688 |
| 4,862,093 | 8/1989 | Jiewertz | |
| 5,087,882 | 2/1992 | Iwata | |
| 5,180,984 | 1/1993 | Murata et al. | |
| 5,207,200 | 5/1993 | Iwata | |
| 5,221,904 | 6/1993 | Shimasaki et al. | |

OTHER PUBLICATIONS

Danyluk: "A UHV Guarded Kelvin Probe"–Journal of Scientific Instruments–Mar. 1972.

*Primary Examiner*—Kenneth A. Wieder
*Assistant Examiner*—Jose M. Solis
*Attorney, Agent, or Firm*—Allan J. Lippa; Roger L. May

[57] ABSTRACT

A method and a circuit are provided for detecting low level ionic currents. An ionization detection voltage is applied to a spark plug and a resulting output voltage signal is sent to a threshold device. The output voltage signal is developed by a low offset operational amplifier. First and second serially connected Zener diodes carry current in a normal diode direction when a spark event occurs and carry current in their Zener breakdown mode upon recovery from the spark event. A second operational amplifier and its associated feedback circuit generate a guard voltage which is applied to the junction of the two Zener diodes. The guard voltage is regulated to track the input voltage to the circuit at the cathode of the first diode. Because the guard voltage is essentially the same as the input voltage, there is no leakage current flow through the first diode. Consequently, the output voltage signal developed at the threshold device is attributable exclusively to ionization current and very low signal levels can be detected. The resulting signal from the threshold device is utilized in detection logic with other vehicle signals to provide a misfire output signal to detect misfires.

15 Claims, 3 Drawing Sheets

METHOD AND APPARATUS FOR DETECTING IONIC CURRENT IN THE IGNITION SYSTEM OF AN INTERNAL COMBUSTION ENGINE

CROSS REFERENCE TO RELATED APPLICATION

This application is a continuation-in-part of U.S. patent application Ser. No. 043,121, filed Apr. 5, 1993, now U.S. Pat No. 5,321.978 entitled "Method and Apparatus For Detecting Cylinder Misfire in an Internal Combustion Engine", and assigned to the assignee of the present application.

TECHNICAL FIELD

This invention relates to methods and apparatus for detecting ionic current in the ignition system of an internal combustion engine and, in particular, to method and apparatus for detecting low level ionic current in the ignition system of an internal combustion engine.

BACKGROUND ART

The fact that ions exist in a spark plug gap after fuel combustion can be utilized for many purposes. For example, there is a known relationship between ionization current and engine misfires.

An ion detection system in its simplest form consists of a DC power supply (usually +100 volts or greater), a series resistor in the multi-megohm range, and the center electrode of the spark plug in the cylinder (the ion probe). The technique of ion detection is well known and dates back to the 1930's.

Ion detection is a difficult technique to apply because of electromagnetic interference present in a vehicle. In particular, the presence of noise (spark event) three orders of magnitude larger than the signal and on the signal line creates severe problems. Difficulties also occur when sensing a microampere level signal in the presence of the relatively high DC voltage supply used to detect ions. As illustrated in U.S. Pat. Nos. 5,180,984; 5,207,200; 5,087, 882; and 4,862,093, previous investigators have used capacitive coupling to remove the DC voltage, but this can produce difficulties with recovery time from the large transients (spark events) if long time constant coupling (large capacitor) is used. In either case, a reduction in signal-to-noise ratio is experienced.

Other investigators have used an isolated power supply (neither output terminal grounded), with an ion current sensing resistor between the return line and circuit ground. This eliminates the distortion problems referred to previously, but is a very inconvenient configuration and tends to be noisy.

SUMMARY OF THE INVENTION

An object of the present invention is to provide a method and apparatus for detecting ionic current in an ignition system of an internal combustion engine in a more accurate and simpler fashion than the prior art.

Another object of the present invention is to provide a method and apparatus for detecting low level ionic current in an ignition system for internal combustion engines in a high temperature environment.

In carrying out the above objects and other objects of the present invention, a method is provided for detecting low level ionic current in an ignition system of an internal combustion engine. The ionic current is generated after combustion of fuel in the engine. The method includes the step of applying an ignition detection voltage to a spark plug of the ignition system after fuel combustion to obtain an input voltage signal representative of the ionic current at one node of a circuit element. The method also includes the steps of generating an output signal having a magnitude based on the input voltage signal, comparing the magnitude of the output signal with a predetermined threshold to provide an ionic current detect signal, and generating a guard voltage signal based on the output signal. The guard voltage signal substantially tracks the input voltage signal. Finally, the method includes the step of applying the guard voltage signal at a second node of the circuit element wherein substantially no leakage current flows through the circuit element.

Still further in carrying out the above objects and other objects of the present invention, apparatus is provided for detecting low level ionic current in an ignition system of an internal combustion engine. The ionic current is generated after combustion of fuel in the engine. The apparatus includes means for applying an injection detection voltage to a spark plug of the injection system after fuel combustion to obtain an input voltage signal representative of the ionic current at one node of a circuit element coupled to the spark plug. The apparatus also includes first means coupled to the first node for generating an output signal based on the input voltage signal, means coupled to the first means for comparing the magnitude of the output signal with a predetermined threshold to provide an ionic current detect signal and second means coupled to the first means for generating a guard voltage signal based on the output signal. The guard voltage signal substantially tracks the input voltage signal. Finally, the apparatus also includes means coupled to the second means for applying the guard voltage signal to a second node of the circuit element so that substantially no leakage current flow through the circuit element.

Preferably, the circuit element is a diode having a cathode. The cathode of the diode is DC coupled to the first means for generating. Also, preferably, the diode is a Zener diode.

The above objects and other objects, features, and advantages of the present invention are readily apparent from the following detailed description of the best mode for carrying out the invention when taken in connection with the accompanying drawings.

BRIEF DESCRIPTION OF THE DRAWING FIGURES

BEST MODE FOR CARRYING OUT THE INVENTION

Figure 1:
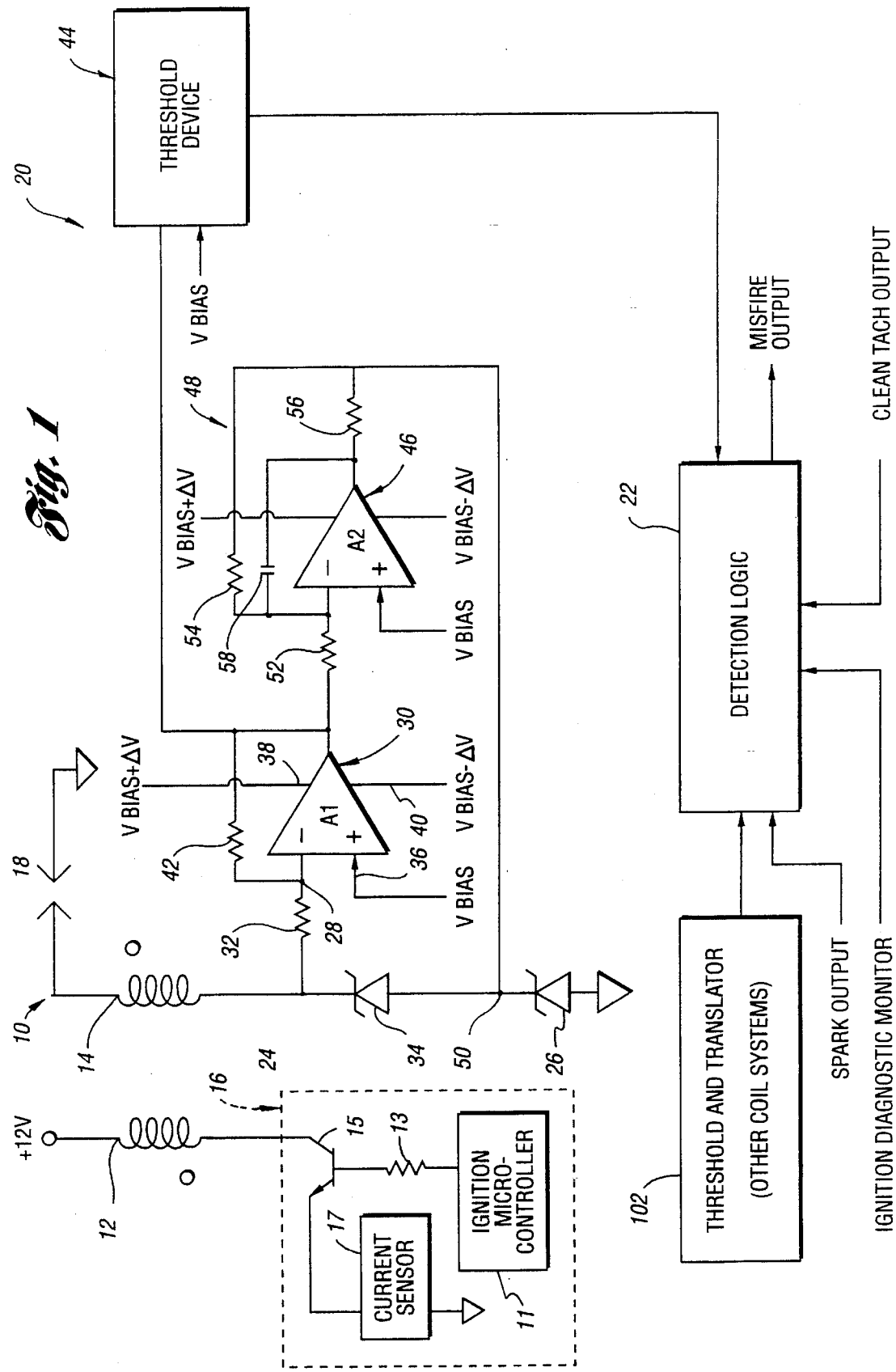
FIG. 1 is a schematic diagram illustrating the method and apparatus (i.e. circuit) of the present invention.

Referring now to the drawing figures, there is illustrated in FIG. 1 an ignition coil, generally indicated at 10, of an ignition system of an internal combustion engine of a motor vehicle. The ignition coil 10 includes a primary winding 12 and an isolated secondary winding 14. Preferably, the ignition coil used is a coil-on-plug (COP) ignition coil. The coils of a COP are unique in that the coils are magnetically biased so that a greater charge can be applied and therefore higher energy can be obtained from a smaller coil package. This bias does not impact the function of the ionization detection system.

The ignition system includes a coil switching device, generally indicated at 16, which, in turn, includes an ignition microcontroller 11, a resistor 13, a transistor 15, and a current sensor 17. Resistor 13 preferably has a value of 1 kilohm. The ignition system further includes a spark plug 18.

FIG. 1 also shows apparatus or a circuit, generally indicated at 20, for detecting ionic current in the ignition system after combustion of fuel in the engine. Finally, FIG. 1 shows a block diagram of detection logic 22 with various vehicle inputs for providing a misfire output signal. There is only one set of detection logic 22 for the vehicle, not one per cylinder. Also, more than one coil-spark plug combination can be connected to the input of the circuit 20 at node 24.

It has been found that two coils per circuit 20 is optimum to keep signals from encroaching upon the time slices reserved for others. This phenomenon becomes prevalent at high RPM.

Three signals from the vehicle are required by the detection logic 22. These are:

1. Ignition Diagnostic Monitor, IDM—The IDM occurs synchronously with the spark event. One positive pulse per firing event used to identify the start of the ignition discharge. The IDM pulse for cylinder 1 has a different pulsewidth so that cylinder identification and synchronization can be achieved.

2. Clean Tach Output, CTO—One negative pulse per cylinder event. Negative edge occurs 9 crank degrees before top dead center.

3. Spark Output, SPOUT—pulsewidth encoded signal used by the ionization detection system to determine if ignition is operating in the multi-strike ignition mode.

Figure 2:
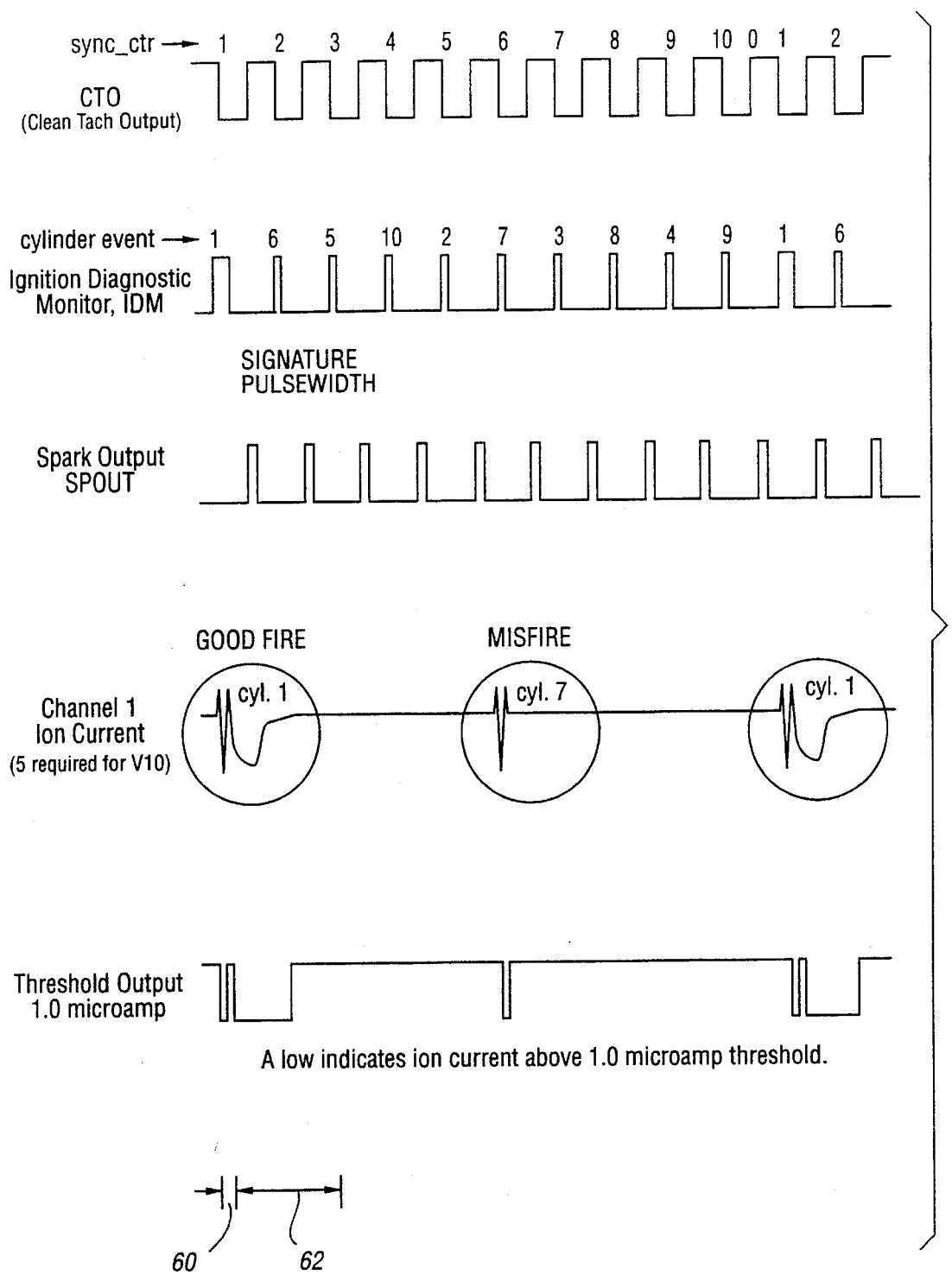
FIG. 2 is an expanded timing diagram of the detection logic circuit which forms part of the invention.

FIG. 2 shows the timing relationships of the CTO, IDM and SPOUT signals previously described. The position of the IDM signal is typically prior to the CTO falling edge but can also follow this edge.

FIG. 2 also shows the detailed relationship between CTO, IDM and the ion current signals along with the blanking one shot signal. The flat topped portion of the ion current wave form is the spark event which causes amplifier saturation. The blanking one shot is triggered by every spark event including re-strikes and prevents ion current sampling until this spark transient has decayed.

The signal processing algorithm begins when the signature IDM pulse for cylinder #1 is detected. At this point, the ionization detection system is synchronized for cylinder identification. The SPOUT signal is monitored to determine if the ignition is operating in the single strike or multi-strike mode. Upon detection of each subsequent IDM pulse, a blanking window 60 is initiated in the algorithm that has a duration of 2.2 milliseconds if the ignition system operation is single strike and 5.6 milliseconds if the ignition system operation is multi-strike.

A very diverse if not chaotic pattern of the ion current signals occurs in normal engine operation, so it is desirable to look at the integral of ion current to reduce variability.

A time-based integral with a highly variable. measuring interval (changing RPM) would require normalization (areas under the curve are much larger at the low RPM than at high RPM). This difficulty is eliminated by using a rotation-based integrator which takes the same number of samples regardless of RPM and maintains the same criterion for detection of misfire.

Immediately following the blanking window 60, a sampling window 62 is opened to allow sampling of ionization current. The duration of the sampling window 62 is equal to two Clean Tach Output (CTO) periods of crank degrees (or 144 crank degrees) starting at the end of the blanking window 60. A sample is taken approximately every 4.5 crank angle degrees during the sampling window 62.

If the sampled ionization current has not exceeded 1 micro amp, a high level threshold pulse is produced. If the sampled ionization current has exceeded 1 micro amp, a low level threshold pulse is produced. If the number of low level pulses sampled is greater than or equal to two, then a good combustion event is determined. If the number of low level pulses sampled is less than two, then a misfire is determined.

Detection logic 22 then communicates cylinder combustion information to the engine controller. If a good combustion event is determined, the detection logic 22 outputs a pulse with a width having a first predetermined length, for example, 512 microseconds. If a misfire is determined, the detection logic 22 outputs a pulse width having a second predetermined length, for example, 1024 microseconds.

Detection logic 22 has been described by the implementation of software. One skilled in the art could also implement detection logic 22 using discrete hardware.

Referring again to FIG. 1, the circuit 20 includes a Zener diode 26, preferably 56 V, which carries current in the normal diode direction when the spark event occurs, and carries current in the Zener breakdown mode upon recovery from the spark event. The Zener diode voltage is greater than an ignition detection or bias supply voltage, VBias, applied to the spark plug by the circuit 20. Therefore, the rest of the circuit 20 is shut off at the appropriate time after the spark event and before the ion current flow which follows. This maximizes the window for acceptable sampling of the ion current. This is an important feature for fast burn engines.

In particular, VBias is the ionization detection voltage which is applied to the spark plug 18 through a resistor 32, preferably 499 kilohms, which couples the inverting input 28 of the operational amplifier 30 to the node 24 which is also coupled to cathode of a first circuit element or Zener diode 34, preferably 39 V. The anode of the Zener diode 34 is connected to the cathode of the Zener diode 26.

Preferably, the operational amplifier 30 is a low offset voltage and low input bias current operational amplifier such as an LM 108. The non-inverting input 36 of the operational amplifier 30 is biased with the ionization detection voltage. The operational amplifier 30 also includes power supply voltages VBias+$\Delta$V at input 38 and voltage VBias−$\Delta$V at input 40. Preferably, VBias is on the order of 40 volts and $\Delta$V is on the order of 10 volts.

A first feedback circuit in the form of a feedback resistor 42, preferably 499 kilohms, allows a mirror image (around 40 V) of the ionization detection voltage to be generated from the inverting input 28 to the output of the operational amplifier 30.

After the ionization detection voltage has been applied to the spark plug 18, the operational amplifier 30 generates a signal at its output having a magnitude based on the input voltage signal appearing at the node 24. The magnitude of the output signal from the operational amplifier 30 is compared with a predetermined threshold such as the ignition detection voltage at a threshold device, generally indicated at 44.

Figure 3:
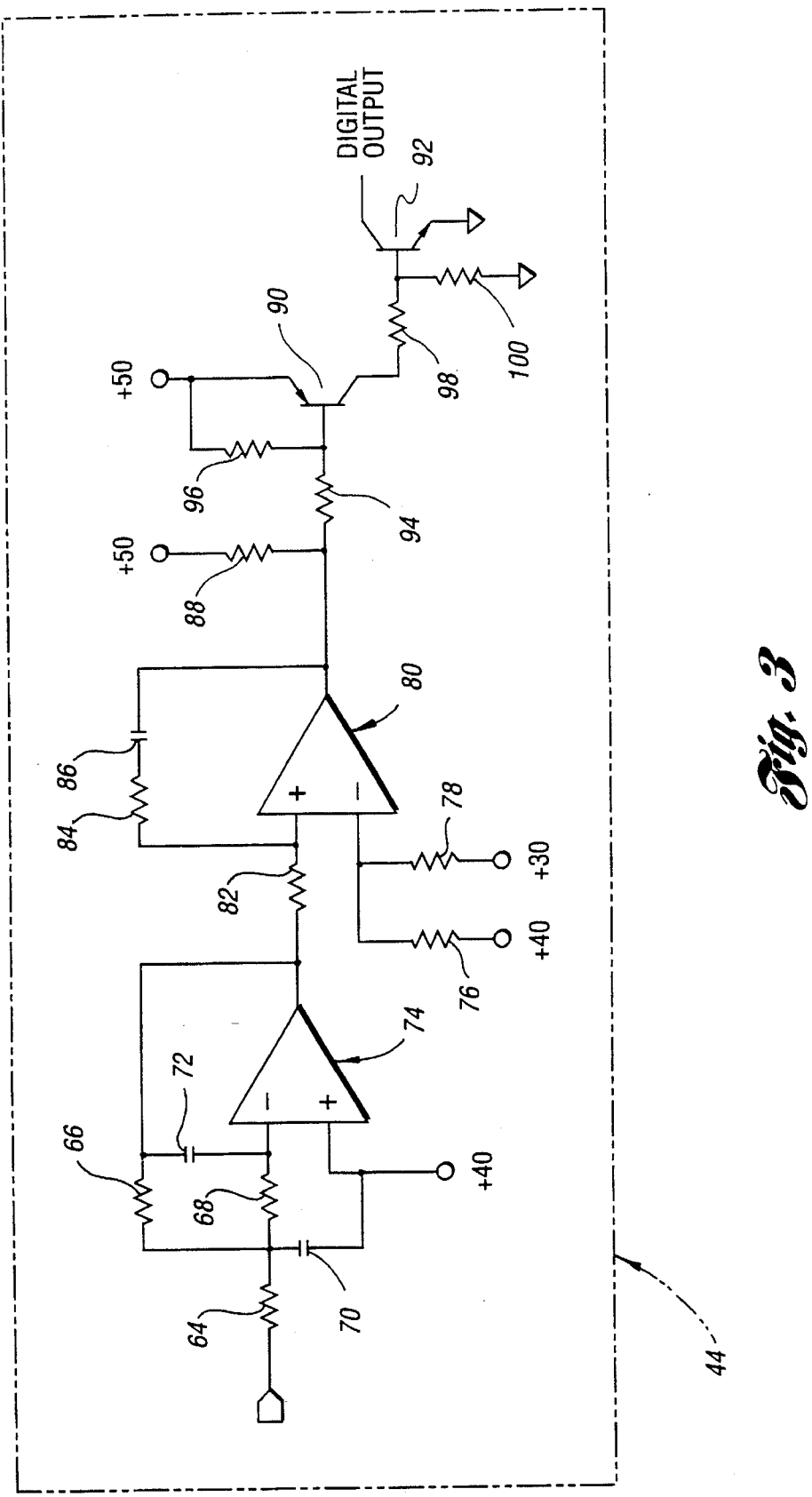
FIG. 3 is a schematic diagram of the threshold device used with the present invention.

Referring to FIG. 3, the threshold device 44 is now described. Input into the threshold device 44 is obtained from the output of the operational amplifier 30. The device 44 includes resistors 64, 66, and 68, capacitors 70 and 72, and an operational amplifier 74 which collectively define an inverting unity gain amplifier. Preferably, the operational amplifier 74 is an LM 124 and resistors 64 and 66 have a value of 35.7 kilohms, resistor 68 has a value of 17.8 kilohms, capacitor 70 has a value of 0.039 microfarads, and capacitor 72 has a value of 0.01 microfarads. With this configuration, a filter cutoff frequency of 320 Hz with a 40 dB per decade roll-off is obtained.

The output of the operational amplifier 74 is a signal that is centered around a bias voltage of 40 Vdc. When ionization is present, the output of the operational amplifier 74 will drop from the 40 Vdc reference by an amount that is proportional to the magnitude of ionization.

The device 44 also includes resistors 76 and 78 (preferably 10 kilohms and 182 kilohms, respectively), and an operational amplifier 80, preferably an LM 139. The resistors 76 and 78 define a divider network that determines the threshold level of the comparator 80.

The device 44 also includes resistors 82 and 84 which preferably have values of 10 kilohms and 1 megaohms, respectively, and a capacitor 86 which is preferably 200 picofarads.

The level of threshold voltage is set to 39.5 Vdc. When the output of the operational amplifier 74 falls below 39.5 Vdc, the output of the comparator 80 will switch to the lower rail voltage of 30 Vdc. If the output of the operational amplifier 74 is above 39.5 Vdc, then the output of the comparator 80 will be pulled up to 50 Vdc through the resistor 88, preferably 20 kilohms. If the output of the comparator 80 is a low level, then the transistor 90 is biased on which, in turn, provides a bias to the transistor 92 and will cause the transistor 92 to also turn on, pulling the digital output to ground level, thereby translating the level from VBias to ΔV to ground level. The device 44 typically includes resistors 94, 96, 98 and 100 which preferably have values of 100 kilohms, 51 kilohms, 390 kilohms and 51 kilohms, respectively.

Therefore, when the level of ionization current has exceeded 1 microamp, the input voltage to the operational amplifier 80 will be below 39.5 Vdc and the digital output will be at zero volts. If the level of ionization current is below 1 microamp, the input voltage to the operational amplifier 80 will be above 39.5 Vdc and the digital output transistor 92 will turn off and the output voltage will be pulled up to a level established by the detection logic 22. The output of the threshold device 44 is coupled to the detection logic 22 to determine whether a misfire output signal should be generated by the detection logic 22 as previously described.

In order to avoid Zener diode leakage, the two Zener diodes 26 and 34 are utilized and a guard voltage signal is generated by a second operational amplifier, generally indicated at 46 in FIG. 1, together with its respective feedback circuitry, generally indicated at 48. The guard voltage signal is applied to the node or junction 50 between the two Zener diodes 34 and 26. The guard voltage is regulated to track the input voltage appearing at the cathode of the Zener diode 34 by the feedback circuit 48 surrounding the operational amplifier 46. Preferably, the operational amplifier is an LM 124 and the feedback circuit 48 is a resistive capacitance circuit wherein resistors 52 and 54 have values of 100 kilohms, resistor 56 has a value of 20 kilohms, and capacitor 58 has a value of 51 picofarads.

Because the guard voltage is essentially the same as an input voltage appearing at the node 24, there is no leakage current flow through the Zener diode 34. Therefore, any voltage developed at the threshold device 44 is attributable exclusively to ionization current and very low signal levels can be detected.

The ionization detection circuit 20 depicts a single channel. An identical circuit is required for each channel. A single channel can monitor two cylinders that fire 360 degrees apart. Therefore, additional channels would be monitored by additional circuits 20 and can be coupled to detection logic 22 as indicated by the threshold and translator 102.

The advantages accruing to the method and apparatus of the present invention are numerous. For example, the ionization detection signal can be translated to a ground reference level without an isolated power supply while maintaining direct current signal coupling. Also, the use of a Zener diode with a positive firing coil minimizes spark interference. Furthermore, an ionization current sampling technique at fixed crankshaft revolution intervals is provided. In addition, blanking of the ignition signal by initiating sampling at a fixed time after the last spark event is provided. All these features provide more accurate and simpler detection of misfires.

Other advantages include the ability of the circuit 20 to operate in a high temperature environment, such as under the hood of an automobile, because of the cancellation of leakage currents. Direct circuit coupling also offers advantages in detection of misfire via ion currents. The circuit 20 consequently permits more sensitivity in detecting such currents.

While the best mode for carrying out the invention has been described in detail, those familiar with the art to which this invention relates will recognize various alternative designs and embodiments for practicing the invention as defined by the following claims.

We claim:

1. A method for sensing low level ionic current in an ignition system having a spark plug and a leaky component connected between a first and second node, the method comprising the steps of:

applying a first voltage signal to bias the spark plug;

converting the ionic current to a second voltage signal representative of the second ionic circuit; and converting the second voltage into a third voltage, the third voltage tracking the value of the first voltage and being applied to the second node to eliminate any influence of the leaky component.

2. Apparatus for sensing low level ionic current in an ignition system having a spark plug and a leaky component connected between a first node and a second node, the apparatus comprising:

first means for applying a first voltage signal at the first node a bias the spark plug, the first means also adapted to convert the ionic current to a second voltage representative of the sensed ionic current; and second means for converting the second voltage into a third voltage, the third voltage tracking the value of the first voltage and being applied to the second node to eliminate any influence of the leaky components.

3. The apparatus as claimed in claim 2 wherein the first means includes a first amplifier having inputs and an output and a first feedback circuit coupled between one of the inputs and the output to provide the second voltage signal.

4. The apparatus as claimed in claim 3 wherein the second means includes a second amplifier having inputs and an output and second feedback circuit coupled between one of the inputs and the output of the second amplifier.

5. The apparatus as claimed in claim 2 wherein the leaky component comprises a diode having a cathode wherein the cathode is DC coupled to the first means.

6. The apparatus as claimed in claim 3 wherein the leaky component is a first Zener diode having a cathode wherein the cathode of the first Zener diode is DC coupled to the one of the inputs of the first amplifier.

7. The apparatus as claimed in claim 4 wherein each of the first and second amplifiers is an operational amplifier.

8. The apparatus as claimed in claim 7 wherein a bias voltage is applied to one of the inputs of the first and second operational amplifiers.

9. Apparatus for sensing a misfire from low level ionic current in an ignition system having a spark plug and a leaky component connected between a first node and a second node, the apparatus comprising:

first means for applying a first voltage signal at the first node to bias the spark plug, the first means also adapted to convert the ionic current to a second voltage representative of the sensed ionic current;

second means for converting the second voltage into a third voltage, the third voltage tracking the value of the first voltage and being applied to the second node to eliminate any influence of the leaky component; and logic means responsive to the first and second means for generating a misfire output signal.

10. The apparatus as claimed in claim 2 further comprising a circuit element coupled to the second node for conducting current in a first direction upon the occurrence of a high voltage ignition signal and for conducting current in a second direction opposite the first direction after the occurrence of the high voltage ignition signal.

11. The apparatus as claimed in claim 10 wherein the circuit element comprises a second Zener diode.

12. The apparatus as claimed in claim 6 further comprising a resistor for DC coupling the cathode of the first Zener diode to the one of the inputs of the first amplifier.

13. The apparatus as claimed in claim 2 further comprising a resistor for DC coupling the first node of the leaky component to the first means.

14. The apparatus as claimed in claim 9 wherein said logic means comprises:

means for sampling said ionic current;

means for comparing said sampled ionic current to a predetermined threshold to determine if a misfire has occurred; and means for generating a misfire output signal upon detection of a misfire.

15. The apparatus as claimed in claim 14 wherein said sampling means is performed using rotation-based integration.

* * * * *